(12) United States Patent
Abu-Huwaij

(10) Patent No.: US 10,909,310 B2
(45) Date of Patent: *Feb. 2, 2021

(54) ASSISTIVE GRAPHICAL USER INTERFACE FOR PRESERVING DOCUMENT LAYOUT WHILE IMPROVING READABILITY

(71) Applicant: Microsoft Technology Licensing, LLC, Redmond, WA (US)

(72) Inventor: Hani Farouq Abu-Huwaij, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,597

(22) Filed: Mar. 13, 2019

(65) Prior Publication Data

US 2020/0050653 A1    Feb. 13, 2020

Related U.S. Application Data

(63) Continuation of application No. 15/097,087, filed on Apr. 12, 2016, now Pat. No. 10,235,348.

(51) Int. Cl.
| | |
|---|---|
| *G06F 17/25* | (2006.01) |
| *G06F 17/27* | (2006.01) |
| *G06F 17/28* | (2006.01) |
| *G06F 40/166* | (2020.01) |
| *G06F 40/106* | (2020.01) |
| *G06F 40/109* | (2020.01) |

(52) U.S. Cl.
CPC ......... *G06F 40/166* (2020.01); *G06F 40/106* (2020.01); *G06F 40/109* (2020.01)

(58) Field of Classification Search
CPC ..... G06F 40/166; G06F 40/109; G06F 40/106
See application file for complete search history.

(56) References Cited

U.S. PATENT DOCUMENTS

| | | | |
|---|---|---|---|
| 10,235,348 B2* | 3/2019 | Abu-Huwaij | ......... G06F 40/166 |
| 10,386,930 B2* | 8/2019 | Hsieh | ...................... G06F 3/017 |
| 2004/0253568 A1* | 12/2004 | Shaver-Troup | ........ G09B 17/00 |
| | | | 434/178 |
| 2015/0331962 A1* | 11/2015 | Liang | .................... G06F 40/109 |
| | | | 715/249 |

* cited by examiner

*Primary Examiner* — Mohammed H Zuberi
*Assistant Examiner* — Carl E Barnes, Jr.
(74) *Attorney, Agent, or Firm* — Schwegman Lundberg & Woessner, P.A.

(57) ABSTRACT

Technologies are described herein for providing an assistive graphical user interface for preserving document layout while improving readability, such as for persons with dyslexia or another type of reading disability. A document including one or more lines of text can be edited in first and second editing modes. When a request is received to edit the document in the second editing mode, the width of the lines when displayed using a non-assistive font is computed. The width of the lines when displayed using an assistive font, such as a font configured for use by persons with dyslexia, is also computed. A ratio between the width of the lines when displayed using the non-assistive font and the width of the lines when displayed using the assistive font is also computed. The width of the page is then expanded based upon the ratio and the lines are displayed using the assistive font.

20 Claims, 12 Drawing Sheets

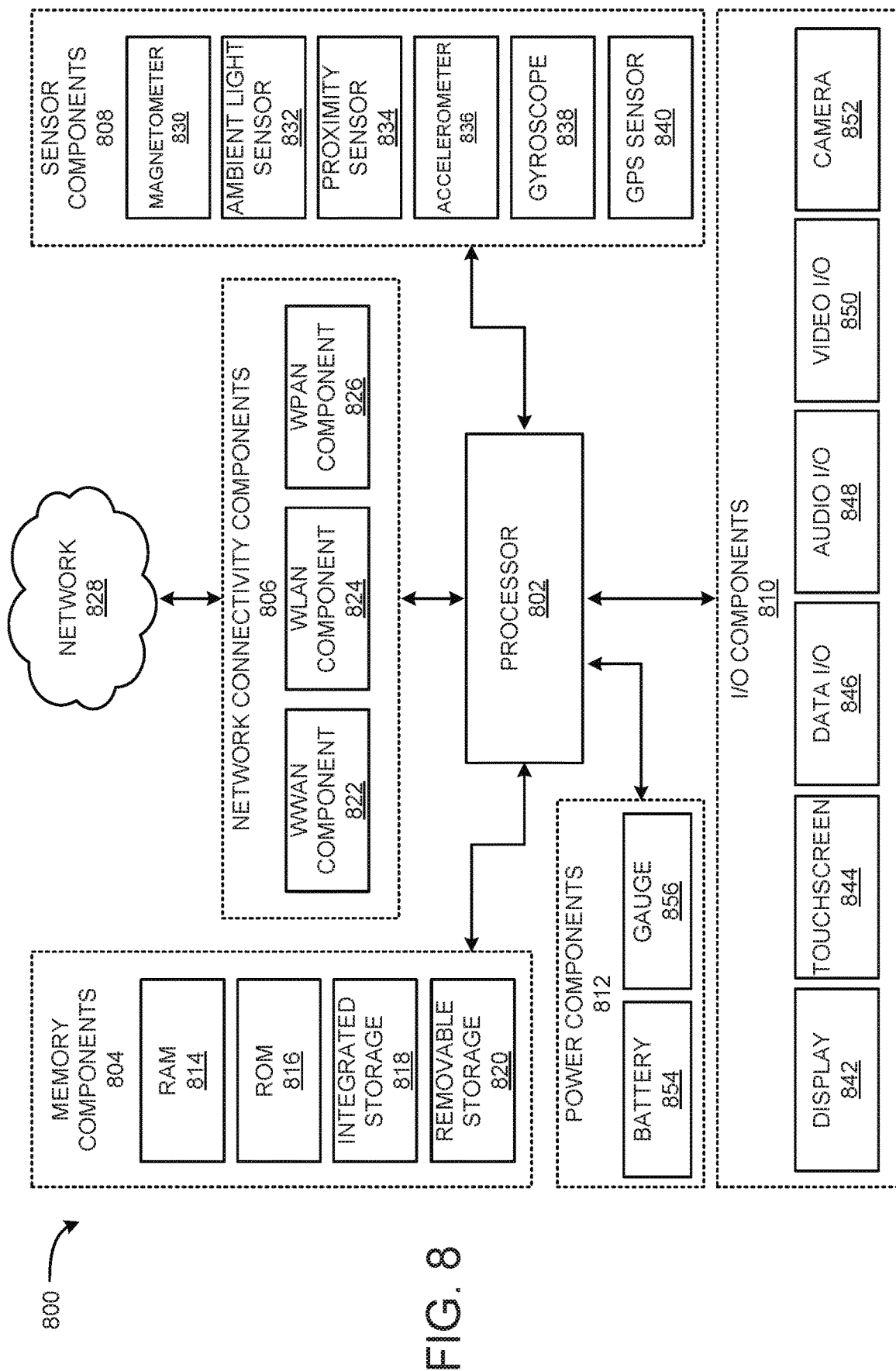

ASSISTIVE GRAPHICAL USER INTERFACE FOR PRESERVING DOCUMENT LAYOUT WHILE IMPROVING READABILITY

CLAIM OF PRIORITY

This application is a Continuation application under 35 USC § 120 of U.S. patent application Ser. No. 15/097,087, entitled "Assistive Graphical User Interface for Preserving Document Layout While Improving the Document Readability," filed on Apr. 12, 2016, and is herein incorporated by reference in its entirety.

BACKGROUND

Computer users with dyslexia or other types of reading disabilities can experience difficulty when reading on-screen text. In an attempt to address this problem, fonts have been created that are easier for people with such disabilities to read. These fonts might, for example, increase the spacing between letters or words in order to reduce word crowding and thereby improve word identification. Other attributes of such a font might also be defined in a manner to enable users with dyslexia or another type of reading disability to more easily read text that has been displayed using the font.

In order to make on-screen text more readable by users with dyslexia and other types of reading disabilities, the font, or fonts, used by a document are commonly replaced with a font that improves readability of the document for people with such disabilities, such as those described above. However, by replacing the fonts used in a document with fonts that are more easily readable by persons with reading disabilities, all of the document layout can be lost. For example, the number of pages, text layout, line endings, and page endings within a document can change as a result of such a font substitution. These changes can also be persisted to the document when the document is subsequently stored. These types of modifications to a document can be unacceptable for certain categories of documents, such as government documents or contracts.

It is with respect to these and other considerations that the disclosure made herein is presented.

SUMMARY

Technologies are described herein for providing an assistive document editing graphical user interface ("GUI") that improves the readability of on-screen text for users with dyslexia and other types of reading disabilities, while at the same time preserving the on-screen and printed layout of the document that contains the text. Fonts contained in or referenced by a document that has been displayed and edited using the mechanisms disclosed herein are not replaced by fonts that are more easily readable by persons with reading disabilities and, therefore, no changes are persisted to the document when it is subsequently stored. Consequently, through an implementation of the technologies disclosed herein, a GUI can be provided for performing document editing and other tasks that results in greater readability of on-screen text and, therefore, that also reduces the number of input errors made by persons with reading disabilities such as those described above. Technical benefits other than those specifically identified herein can also be realized through an implementation of the disclosed technologies.

According to one configuration disclosed herein, an application program can permit editing of a document in a first editing mode. In the first editing mode, a standard document editing GUI is provided in which a user can edit a document having one or more pages and lines of text in a traditional fashion. For example, and without limitation, the user can insert text, delete text, specify or change fonts, specify or change formatting, insert or remove images, or perform other conventional document editing functions through the use of the standard document editing GUI. Other types of document creation and editing functions not specifically mentioned herein can also be performed in the first editing mode.

The application program can also permit editing of the document in a second editing mode. In the second editing mode, an assistive document editing GUI is provided that improves the readability of on-screen text for users with dyslexia and other types of reading disabilities, while at the same time preserving the layout of the document that contains the text. In order to provide the assistive document editing GUI, the application program can calculate the on-screen width of lines in the document when displayed using a non-assistive font (which might be referred to herein as a "standard font") in the first editing mode.

The application program can also calculate the on-screen width of lines in the document when displayed using an assistive font. An assistive font is a font that has been designed for improved readability by users with dyslexia or another type of reading disability. As mentioned above, assistive fonts might, for example, increase the spacing between letters or words in order to reduce word crowding and improve word identification. Other attributes of assistive fonts might also be defined in a manner intended to enable users with dyslexia or another type of reading disability to more easily read text that has been displayed using such a font.

The application program can then calculate a ratio of the width of the lines of text when rendered using the standard font to the width of the lines of text when rendered using the assistive font. In one configuration, the line of text on a page of the document that has the largest calculated ratio is identified. The width of a page in the document is then expanded based upon the largest calculated ratio.

Once the width of the page has been expanded, the lines of text can be displayed using the assistive font. Because the width of the page has been expanded in the second editing mode, the lines of text in the document will end at the same location when displayed in the assistive document editing GUI as when displayed in the standard document editing GUI. Additionally, paragraphs and pages in the document will also end at the same locations when displayed in the assistive document editing GUI as when displayed in the standard document editing GUI. In this way, document formatting is preserved while at the same time providing improved on-screen readability for users with dyslexia or other disabilities.

The user can also edit the document in the second editing mode in the same manner as in the first editing mode. For example, and without limitation, the user can insert text, delete text, specify or change fonts, specify or change formatting, insert or remove images, or perform other conventional document editing functions using the assistive document editing GUI. Other types of document editing functions not specifically mentioned herein can also be performed in the second editing mode. When a request is received to save the document, however, the document is not modified to include or reference the assistive font. Rather, the document is saved in the same manner as it would have been had the text contained therein not been displayed in the assistive document editing GUI. As a result, other users that receive and view the document will see the original formatting of the document (e.g. line breaks, paragraph breaks, page breaks, etc.).

In one configuration, an on-screen ruler is presented in conjunction with a display of the document in the standard document editing GUI. When the assistive document editing GUI is entered, the on-screen ruler can also be scaled using the largest calculated ratio computed in the manner described above. In this way, the on-screen ruler can be expanded to reflect the change in the width of the text that occurs as a result of displaying the text using the assistive font. The on-screen ruler can be returned to its original size when editing is again performed using the standard document editing GUI.

In another configuration, the document can also include an image. In this configuration, the image can be scaled based upon the largest calculated ratio described above when presented in the assistive document editing GUI. This might be appropriate for vector images, for instance, that can be scaled while still retaining their visual properties.

Alternately, the image can be displayed in its original aspect ratio in the assistive document editing GUI. In this case, a border can be presented around the image that has dimensions that are computed based upon the dimensions of the image and the largest calculated ratio described above. In this way, the content of the image can be displayed in its original aspect ratio while at the same time presenting an indication in the assistive document editing GUI of the dimensions of the image when the page width has been modified in the manner described above. This might be appropriate for bitmapped images that do not scale well, for example.

It should be appreciated that the technologies described briefly above and in greater detail below can be implemented as a computer-controlled apparatus, a computer-implemented process, a computing system, or as an article of manufacture such as a computer readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is a computer architecture diagram illustrating a computing device architecture for another computing device that is capable of implementing aspects of the technologies presented herein.

DETAILED DESCRIPTION

Figure 1:
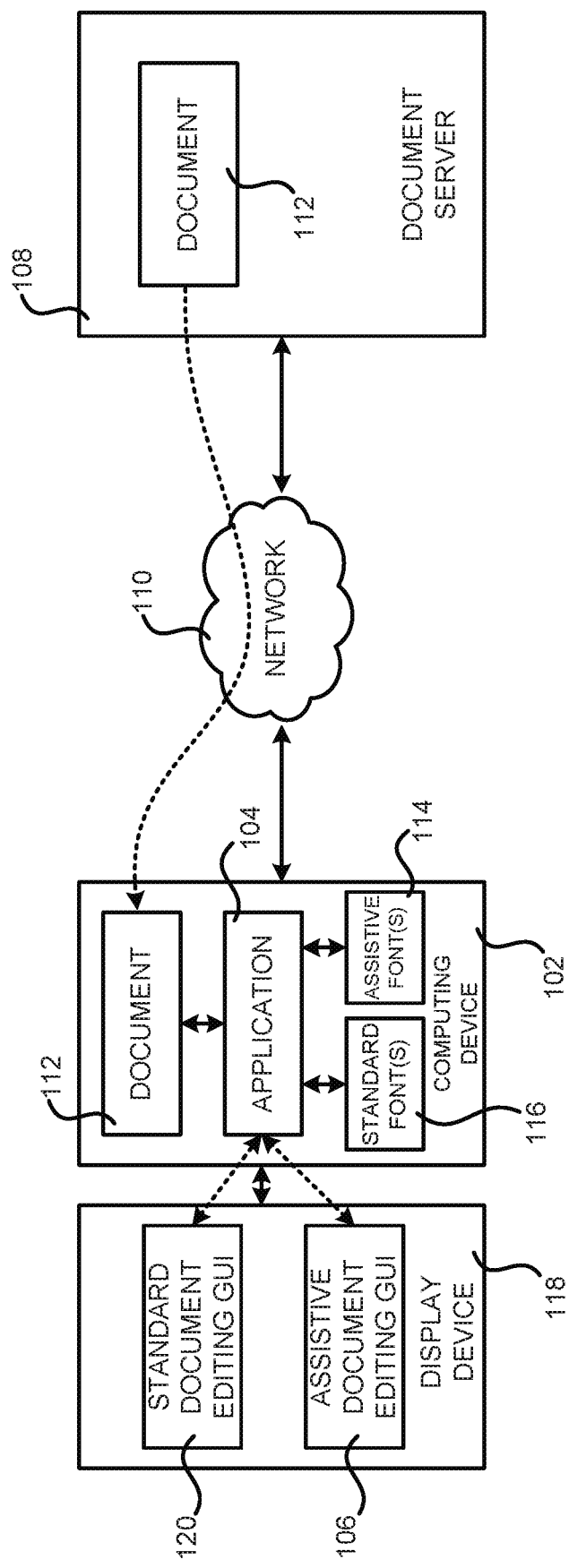
FIG. 1 is a computer architecture and network diagram showing aspects of the configuration and operation of a computing device that implements the various technologies disclosed herein, according to one particular configuration.

The following detailed description is directed to technologies for providing an assistive GUI that improves the readability of on-screen text for users with dyslexia or other types of reading disabilities, while at the same time preserving the layout of a document containing the text. As discussed briefly above, through an implementation of the technologies disclosed herein, an assistive document editing GUI can be provided that improves the readability of on-screen text for users with dyslexia and other types of reading disabilities, while at the same time preserving the on-screen and printed layout of the document that contains the text. Through the use of the disclosed technologies, a GUI can be provided for performing document editing and other tasks that results in greater readability of on-screen text, and that consequently also reduces the number of input errors made by persons with reading disabilities such as those described above. As also mentioned above, technical benefits other than those identified specifically herein can also be realized through the use of implementations of the technologies disclosed herein.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration as specific configurations or examples. Referring now to the drawings, in which like numerals represent like elements throughout the several FIGS., aspects of various technologies for providing an assistive GUI that improves the readability of on-screen text for users with dyslexia or other types of reading disabilities, while preserving document layout will be described.

FIG. 1 is a computer architecture and network diagram showing aspects of the configuration and operation of a computing device 102 that implements the various technologies disclosed herein, according to one particular configuration. As shown in FIG. 1, a computing device 102 is provided in one configuration that executes an application program 104 (which might be referred to herein simply as the "application").

The computing device 102 can be a desktop or laptop computer, a smartphone, a tablet or slate computing device, a set-top box, an e-reader, a video game console, or another type of computing device capable of rendering text on a display device and for enabling editing of the text. As also shown in FIG. 1, the computing device 102 is connected to a display device 118 for displaying the output of the application 104 and other programs. The display device 118 can be a liquid crystal display ("LCD") or another type of display device capable of connecting to the various types of computing devices described herein.

The application 104 can provide functionality for creating and editing documents, such as the document 112. The document 112 can be a word processing document, a presentation document, a spreadsheet document, a web page, or any other type of electronic document containing lines of text content. The document 112 can be retrieved from a document server 108 or another type of computing system by way of a network 110. The document 112 can also be edited, and the edited document can be stored back to the document server 108.

The application 104 is also configured to provided functionality for editing of the document 112 in several different editing modes. In a first editing mode, a standard document editing GUI 120 is provided on the display device 118 in which a user (not shown in FIG. 1) can edit the text and other objects in the document 112 in a traditional fashion. For example, and without limitation, the user can insert text, delete text, specify or change fonts, specify or change formatting, insert or remove images or other types of objects, or perform other conventional editing functions on the document 112. Standard fonts 116 (i.e. non-assistive fonts) are typically utilized in the standard document editing GUI 120. Other types of document editing functions not specifically mentioned herein can also be performed in the first editing mode provided by the application 104.

As mentioned briefly above, the application 104 can also permit editing of the document in a second editing mode. In the second editing mode, an assistive document editing GUI 106 is provided on the display device 118 that improves the readability of on-screen text for users with dyslexia and other types of reading disabilities, while at the same time preserving the layout of the document 112. In order to provide the assistive document editing GUI 106, the application 104 can calculate the on-screen width of the lines in the document 112 when displayed using standard fonts 116 in the first editing mode.

The application 104 can also calculate the on-screen width of the lines of text in the document 112 when displayed using assistive fonts 114. As set forth above, an assistive font 114 is a font that has been designed for improved readability by users with dyslexia or another type of reading disability. As also mentioned above, assistive fonts 114 might, for example, increase the spacing between letters or words in order to reduce word crowding and thereby improve word identification. Other attributes of assistive fonts 114 might also be defined in a manner intended to enable users with dyslexia or another type of reading disability to more easily read text that has been displayed using such a font 114.

The application 104 can then calculate a ratio of the width of the lines of text when rendered using the standard fonts 116 to the width of the lines of text when rendered using the assistive fonts 114. In one configuration, the line of text on a page of the document 112 that has the largest calculated ratio is identified. The on-screen width of a page in the document 112 is then expanded based upon the largest calculated ratio. Additional details regarding the computation of the ratio will be provided below with regard to FIGS. 4A-4B and 5A-5B.

Once the width of the page has been expanded, the lines of text can be displayed using the assistive fonts 114. Because the on-screen width of the page has been expanded in the assistive document editing GUI 106, the lines of text in the document 112 will end at the same location when displayed using the assistive fonts 114 in the assistive document editing GUI 106 as when displayed using the standard fonts 116 in the standard document editing GUI 120. Additionally, paragraphs and pages in the document 112 will end at the same locations when displayed using the assistive fonts 114 in the assistive document editing GUI 106 as when displayed using the standard fonts 116 in the standard document editing GUI 120. In this way, the formatting of the document 112 is preserved, while at the same time providing improved on-screen readability for users with dyslexia or other disabilities.

A user can also edit the document 112 in the assistive document editing GUI 106 in the same way as in the standard document editing GUI 120. For example, and without limitation, the user can insert text, delete text, specify or change fonts, specify or change formatting, insert or remove images or other types of objects, or perform other conventional document editing functions using the assistive document editing GUI 106. Other types of document editing functions not specifically mentioned herein can also be performed in the second editing mode.

When the document 112 is saved, however, the document 112 is not modified to include or reference the assistive fonts 114 used to display text while editing in the assistive document editing GUI 106. Rather, the document 112 is saved in the same manner as it would have been had the text contained therein not been displayed in the assistive document editing GUI 106. As a result, other users that receive and view the document 112 will see the original format of the document 112 (e.g. line breaks, paragraph breaks, page breaks, etc.). Additional details regarding the configuration and operation of the assistive document editing GUI 106 will be provided below with regard to FIG. 3.

In one configuration, an on-screen ruler (not shown in FIG. 1) is also presented in conjunction with a display of the document 112 in the standard document editing GUI 120. When the assistive document editing GUI 106 is entered, the on-screen ruler can also be scaled using the largest calculated ratio described above. In this way, the on-screen ruler can be expanded to reflect the change in the width of the text as a result of displaying the text using the assistive fonts 114. The on-screen ruler can be returned to its original size when editing is again performed using the standard document editing GUI 120. Additional details regarding the modification of the on-screen ruler will be provided below with regard to FIGS. 2A-3.

In another configuration, the document 112 can also include an image (not shown in FIG. 1). In this configuration, the image can be scaled based upon the largest calculated ratio described above when presented in the assistive document editing GUI 106. This might be appropriate for vector images, for instance, that can be scaled while still retaining their visual properties.

Alternately, the image can be displayed in its original aspect ratio in the assistive document editing GUI 106. In this case, a border (not shown in FIG. 1) can be presented around the image that has dimensions that are computed based upon the dimensions of the image and the largest calculated ratio described above. In this way, the content of the image can be displayed in its original aspect ratio while at the same time presenting an indication in the assistive document editing GUI 106 of the dimensions of the image when the page width has been modified in the manner described above. This might be appropriate for bitmapped images that do not scale well, for example. Additional details regarding this aspect will be provided below with regard to FIGS. 4A-4E.

Figure 2A:
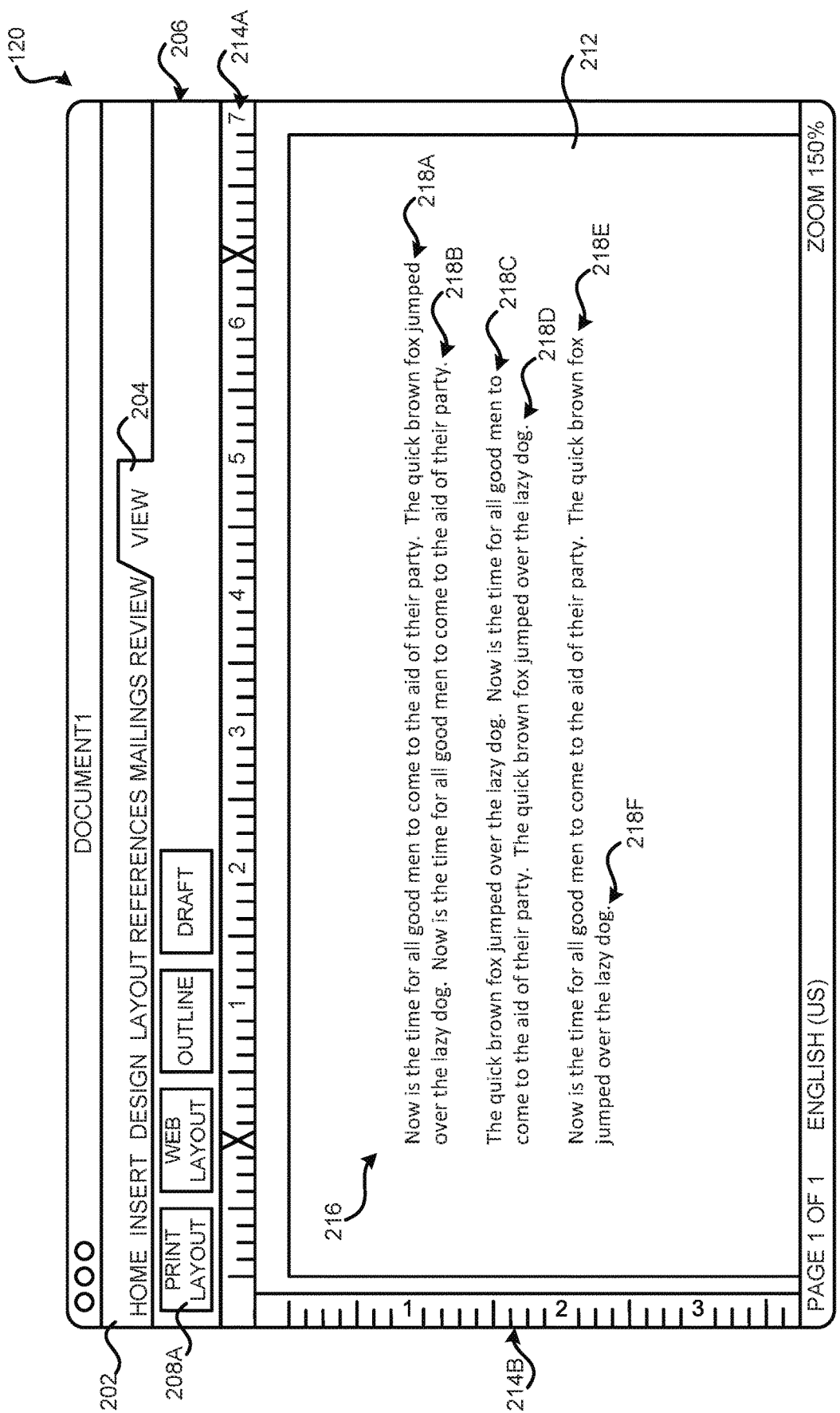
FIGS. 2A and 2B are GUI diagrams showing aspects of a standard document editing GUI.
Figure 2B:
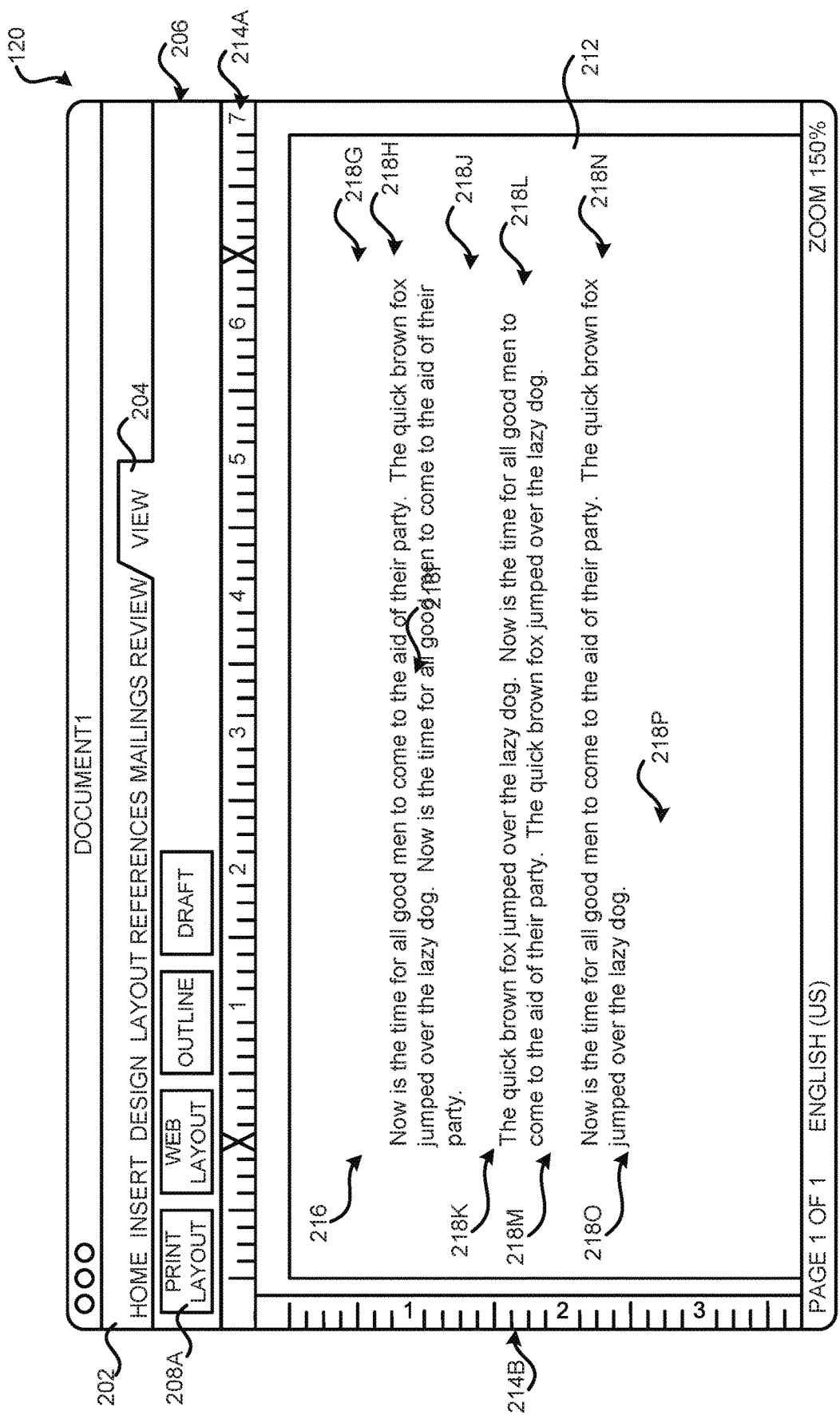

FIGS. 2A and 2B are GUI diagrams showing additional aspects of the standard document editing GUI 120 described briefly above with regard to FIG. 1. As shown in FIG. 2A, the standard document editing GUI 120 includes a menu area 202 containing selectable tabs for accessing the various document creation and editing functions provided by the application 104. For example, a tab 204 can be provided for specifying the on-screen view of a document 112 being edited. In the example shown in FIG. 2A, the tab 204 has been selected, thereby causing GUI buttons to be presented in the button area 206 for specifying the on-screen view that is to be utilized to present the document 112. In this example, a user has selected the print layout button 208A. Selection of the print layout button 208A causes the application 104 to display the document 112 on-screen formatted in the same way that the document 112 will appear when printed. Other types of on-screen views can also be provided in other configurations.

As also shown in FIG. 2A, the standard document editing GUI 120 also includes an editing area 212 in which the document 112 is displayed. In this example, the document 112 being edited includes text 216, which has been formatted as six lines 218-218F organized into three paragraphs. The first paragraph includes the lines 218A and 218B, the second paragraph includes the lines 218C and 218D, and the third paragraph includes the lines 218E and 218F. The text 216 has been presented using standard fonts 116 specified by the document 112. The text 216 can be edited in the editing area 212. For example, and without limitation, text 216 can be added, deleted, formatted, or otherwise modified in the editing area 212 in a conventional fashion. Additionally, images and other types of objects can be added or removed from the document in the editing area 212. Other types of conventional document editing functions can also be performed in the editing area 212.

The standard document editing GUI 120 also includes several on-screen rulers 214A and 214B. The on-screen ruler 214A is oriented horizontally with respect to the text 216 and the on-screen ruler 214B is oriented vertically with respect to the text 216. The standard document editing GUI 120 might also include other GUI controls not specifically shown in FIG. 1. In this regard, it should be appreciated that the GUI elements disclosed herein are merely illustrative and that other types and configurations of GUI elements can be utilized in various configurations of the disclosed technologies.

As discussed above, in order to make on-screen text, such as the text 216, more readable by users with dyslexia and other types of reading disabilities, the font, or fonts, used by a document, such as the document 112, are commonly replaced with a font that improves readability of the document for people with such disabilities, such as those described above. FIG. 2B illustrates such a mechanism. In particular, and as shown in FIG. 2B, the standard fonts 116 utilized to display the text 216 in FIG. 2A have been replaced by an assistive font 114 in FIG. 2B. In this particular example, the assistive font 114 is the open source OPENDYSLEXIA font. It should be appreciated, however, that other types of assistive fonts 114 can be utilized, such as the DYSLEXIE font.

By replacing the standard fonts 116 used in the document 112 with an assistive font 114, as shown in FIG. 2B, all of the document layout can be lost. For instance, in the example shown in FIG. 2B, the six lines 218A-218F of text shown in FIG. 2A have become ten lines 218G-218P of text in FIG. 2B as a result of the substitution of an assistive font 114. Moreover, the lines shown in FIG. 2A now end at different places when displayed using an assistive font 114 as shown in FIG. 2B. The number of pages, text layout, page endings, and other types of formatting within a document 112 can also change as a result of such a font substitution. These changes can also be persisted to the document 112 when the document is subsequently stored to the document server 108. As discussed above, these types of modifications to a document 122 can be unacceptable for certain categories of documents, such as government documents or contracts. The technologies described in detail below with regard to FIGS. 3-5B attempt to address these, and potentially other, considerations.

Figure 3:
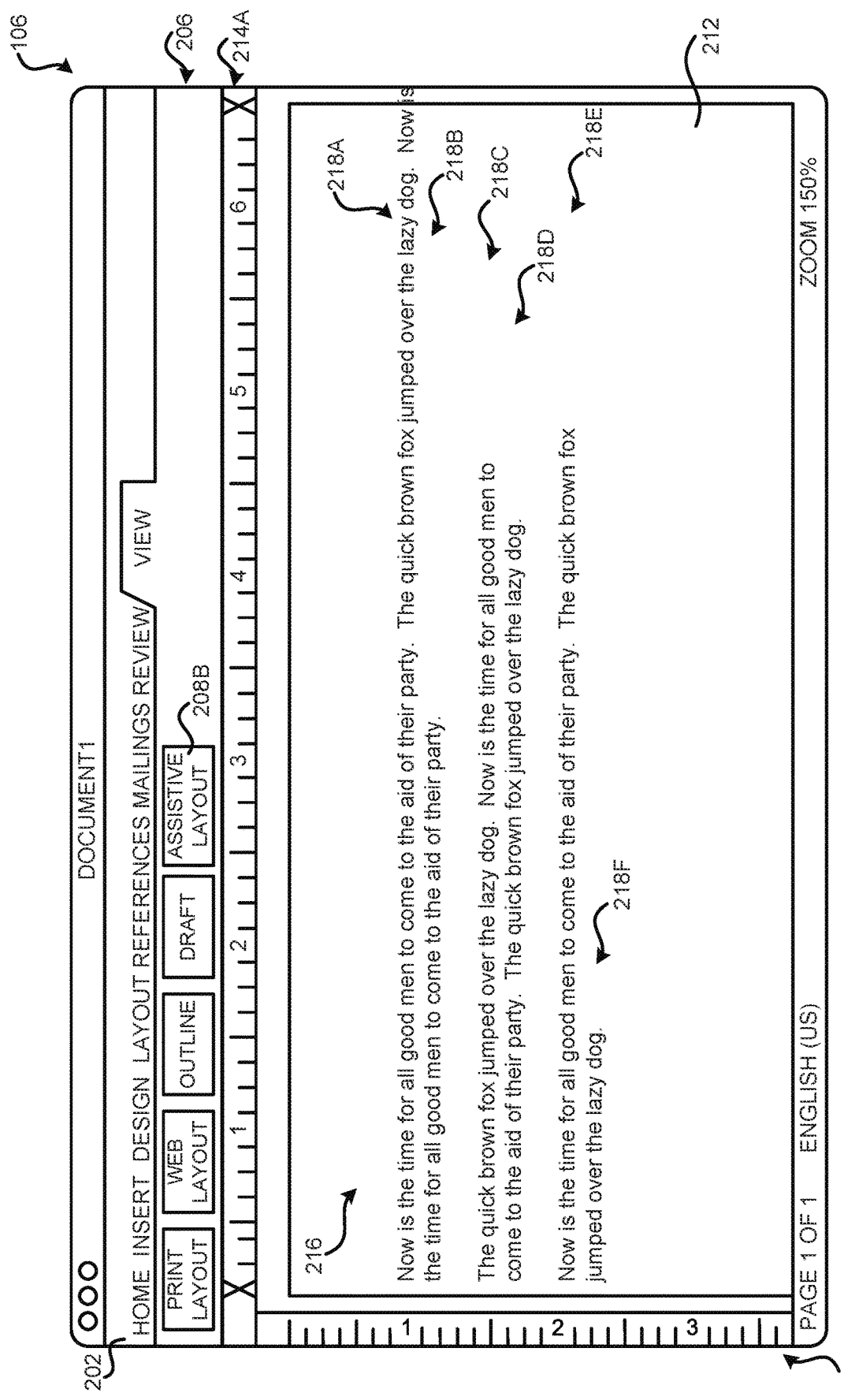
FIG. 3 is a GUI diagram showing aspects of an assistive document editing GUI provided in one particular configuration disclosed herein.

FIG. 3 is a GUI diagram showing aspects of the assistive document editing GUI 106 described briefly above according to one particular configuration disclosed herein. As shown in FIG. 3, the assistive document editing GUI 106 also includes a menu area 202 including a tab 204 for selecting an on-screen layout for the document 112. In this example, however, the button area 206 also includes a button 208B which, when selected, will cause the document 112 to be presented in the assistive document editing GUI 106.

In the example shown in FIG. 3, the same lines 218A-218F of text from the example shown in FIG. 2A have been presented in the assistive document editing GUI 106. In particular, the lines 218A-218F have been displayed in FIG. 3 using the open source OPENDYSLEXIA assistive font 114. In this configuration, however, the lines 218A-218F shown in FIG. 3 end at the same locations as the lines 218A-218F shown in FIG. 2A. For example, the line 218A ends following the word "jumped" when displayed using a standard font 116 as shown in FIG. 2A and ends at the same location when displayed using an assistive font 114 as shown in FIG. 3. The other lines 218B-218F also end at the same locations when displayed using the assistive font 114 as shown in FIG. 3. Additionally, no new lines or paragraphs have been generated and the page containing the text 216 ends at the same location in FIG. 3 as compared to FIG. 2A. In this manner, all of the formatting of the text 216 is retained from the standard document editing GUI 120 shown in FIG. 2A in the assistive document editing GUI 106 shown in FIG. 3.

In order to present the text 216 using an assistive font 114 while at the same time maintaining the formatting of the document 112, the width of a page in the document 112 containing the text 216 is expanded in order to account for the increased width of the assistive font 114. In order to determine the width of the page in the assistive document editing GUI 106, the application 104 can calculate the on-screen width of the lines 218 in the document 112 when displayed using standard fonts 116 in the standard document editing GUI 120, as shown in FIG. 2A for example. The application 104 can also calculate the on-screen width of the lines 218 of text in the document 112 when displayed using assistive fonts 114. The application 104 can then calculate a ratio of the width of the lines 218 of text when rendered using the standard fonts 116 (e.g. in the standard document editing GUI 120) to the width of the lines 218 of text when rendered using the assistive fonts 114 (e.g. in the assistive document editing GUI 106). In one configuration, the line 218 of text on a page of the document 112 that has the largest calculated ratio is identified. The on-screen width of a page in the document 112 is then expanded based upon the largest calculated ratio. Additional details regarding the computation of the ratio in this manner will be provided below with regard to FIGS. 4A-4B and 5A-5B.

Once the width of the page has been expanded, the lines 218 of text can be displayed using the assistive fonts 114, as shown in FIG. 3. Because the on-screen width of the page has been expanded in the assistive document editing GUI 106, the lines 218 of text in the document 112 will end at the same location when displayed using the assistive fonts 114 in the assistive document editing GUI 106 as when displayed using the standard fonts 116 in the standard document editing GUI 120. Additionally, paragraphs and pages in the document 112 will end at the same locations when displayed using the assistive fonts 114 in the assistive document editing GUI 106 as when displayed using the standard fonts 116 in the standard document editing GUI 120. In this way, the formatting of the document 112 is preserved, while at the same time providing improved on-screen readability for users with dyslexia or other disabilities.

The on-screen ruler 214A can also be scaled using the largest calculated ratio computed in the manner described above. In this way, the on-screen ruler 214A can be expanded to reflect the change in the width of the text 216 that occurs as a result of displaying the text 216 using an assistive font 114. The on-screen ruler 214A can be returned to its original size when editing is again performed using the standard document editing GUI 120. In addition, the on-screen ruler 214B can also be scaled in a similar manner if the utilization of the assistive fonts 114 causes the size of the text 216 to change in the vertical direction.

Figure 4A:
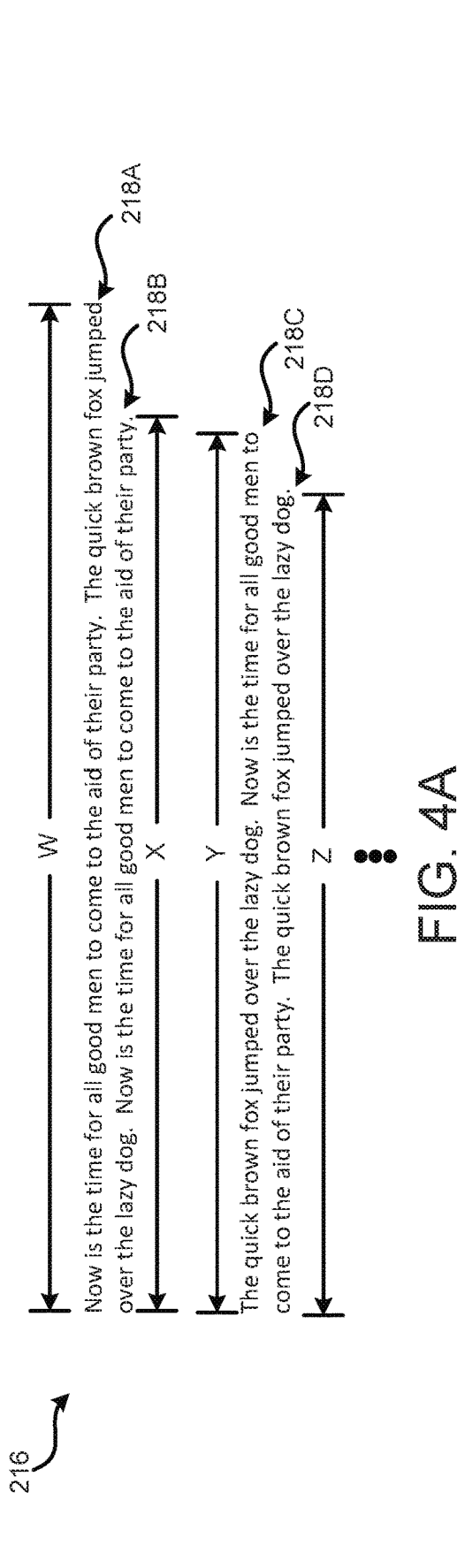
FIGS. 4A-4E are text diagrams showing aspects of the operation of the assistive document editing GUI shown in FIG. 3, according to various configurations disclosed herein.
Figure 4B:
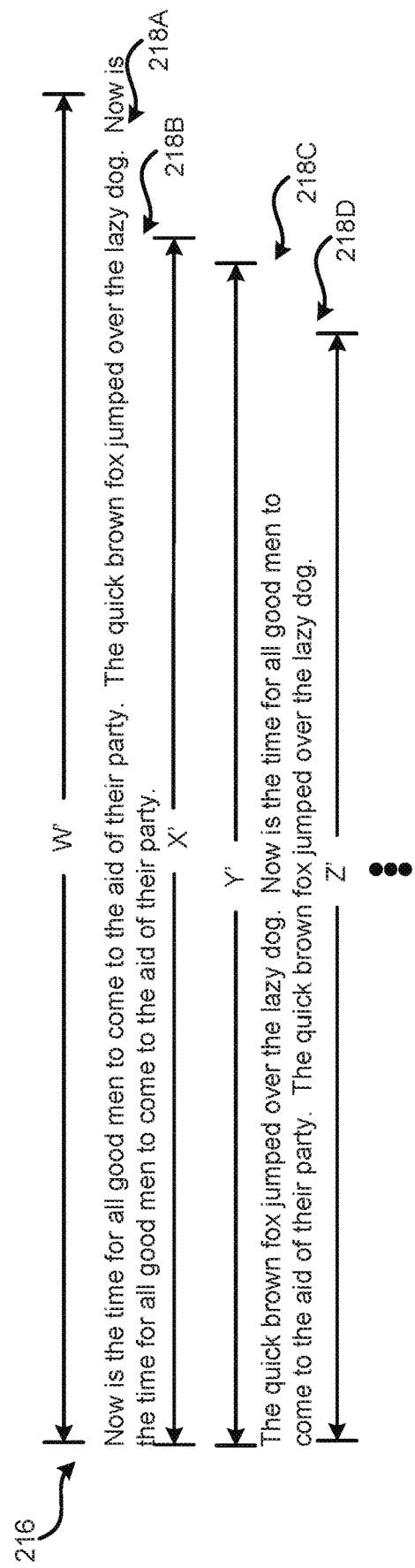

FIGS. 4A-4E are text diagrams showing additional aspects of the operation of the assistive document editing GUI 106 shown in FIG. 3, according to various configurations disclosed herein. In particular, FIGS. 4A and 4B illustrate further aspects of the mechanism described above for computing a ratio for expanding page width in the assistive document editing GUI 106. As discussed briefly above, the ratio for use in expansion of the page width in the assistive document editing GUI 106 is computed in one configuration by first determining the length of the lines 218 of text when displayed using the standard fonts 116 in the standard document editing GUI 120. For instance, and as shown in FIG. 4A, the length of the lines 218A-218D can be computed when displayed in the standard document editing GUI 120. In FIG. 4A, the length of the line 218A is represented as W, the length of the line 218B is represented as X, the length of the line 218C is indicated as Y. and the length of the line 218D is represented as Z.

In order to compute the ratio for use in expansion of the page width in the assistive document editing GUI 106, the application 104 also computes the length of the lines 218 of text when displayed using assistive fonts 114 in the assistive document editing GUI 106. For instance, in FIG. 4B the length of the line 218A is represented as W', the length of the line 218B is represented as X', the length of the line 218C is indicated as Y', and the length of the line 218D is represented as Z'. In the example shown in FIG. 4B, the same lines 218A-218D have been presented in an assistive font (in this case the open source OPENDYSLEXIC font) and, therefore, the lines 218A-218D shown in FIG. 4B are longer than the corresponding lines shown in FIG. 4A.

Once the length of the lines 218 in the standard document editing GUI 120 and the assistive document editing GUI 106 have been computed, the application 104 can then calculate a ratio of the width of the lines 218 of text when rendered using the assistive fonts 114 (e.g. in the assistive document editing GUI 106) to the width of the lines 218 of text when rendered using the standard fonts 116 (e.g. in the standard document editing GUI 120). In the example shown in FIGS. 4A and 4B, for instance, the ratios W'/W, X'/X, Y'/Y, and Z'/Z would be computed for the lines 218A-218D, respectively.

In one configuration, the line 218 of text on a page of the document 112 that has the largest calculated ratio is identified. The on-screen width of pages in the document 112 can then be expanded based upon the largest calculated ratio. By expanding the page width in this manner, the lines 218 of text will end at the same locations when displayed using the assistive fonts 114 as when displayed in the standard document editing GUI 120 using the standard fonts 116. Other types of document formatting, such as paragraph ends and page ends will also be retained. Additional details regarding the computation and utilization of the ratio between lines 218 displayed in the standard document editing GUI 120 and the assistive document editing GUI 106 will be provided below with regard to FIGS. 5A-5B.

Figures 4C, 4D:
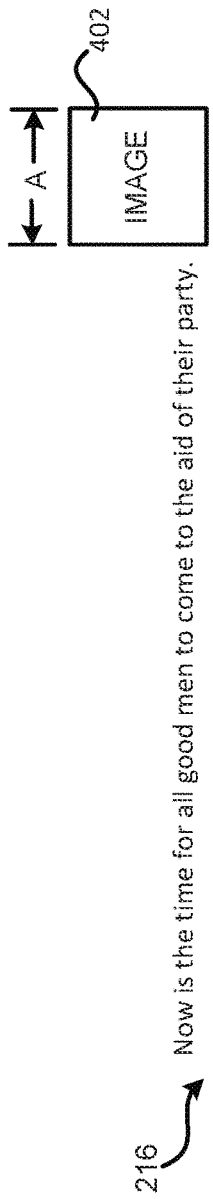
Figure 4E:
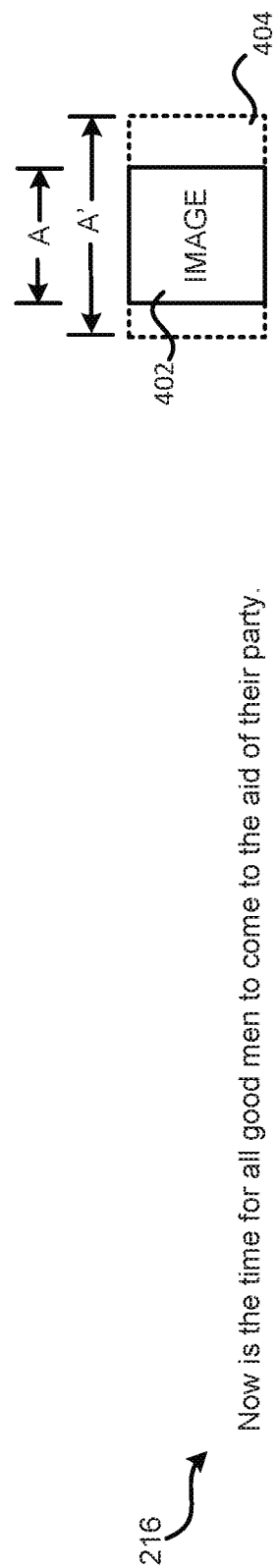

FIGS. 4C-4E illustrate several mechanisms for presenting images in the assistive document editing GUI 106. As shown in FIG. 4C, an image 402 can be displayed in conjunction with the text 216. The image 402 might, for example, be a raster or bitmapped image. In one configuration, the image 402 can also be scaled based upon the largest calculated ratio described above when presented in the assistive document editing GUI 106. This might be appropriate for vector images, for instance, that can be scaled while still retaining their visual properties. FIG. 4D shows that the width A of the image 402 has been scaled to a new width A' based upon the ratio between the length of the lines 218 when displayed in the standard document editing GUI 120 and the assistive document editing GUI 106 in the manner described above.

Alternately, the image 402 can be displayed in its original aspect ratio in the assistive document editing GUI 106. In this case, a border 404 can be presented around the image that has dimensions that are computed based upon the dimensions of the image 402 and the largest calculated ratio described above. In this way, the content of the image 402 can be displayed in its original aspect ratio while at the same time presenting an indication in the assistive document editing GUI 106 of the dimensions of the image 402 when the page width has been modified in the manner described above. This might be appropriate for bitmapped images that do not scale well, for example. FIG. 4E shows that the image 402 has been displayed using the width A, but that a border 404 has been presented around the image 402 having a width A' determined based upon the calculated ratio described above. Other types of indicators might also be provided for the border 404 other than the dotted line shown in FIG. 4E.

Figure 5A:
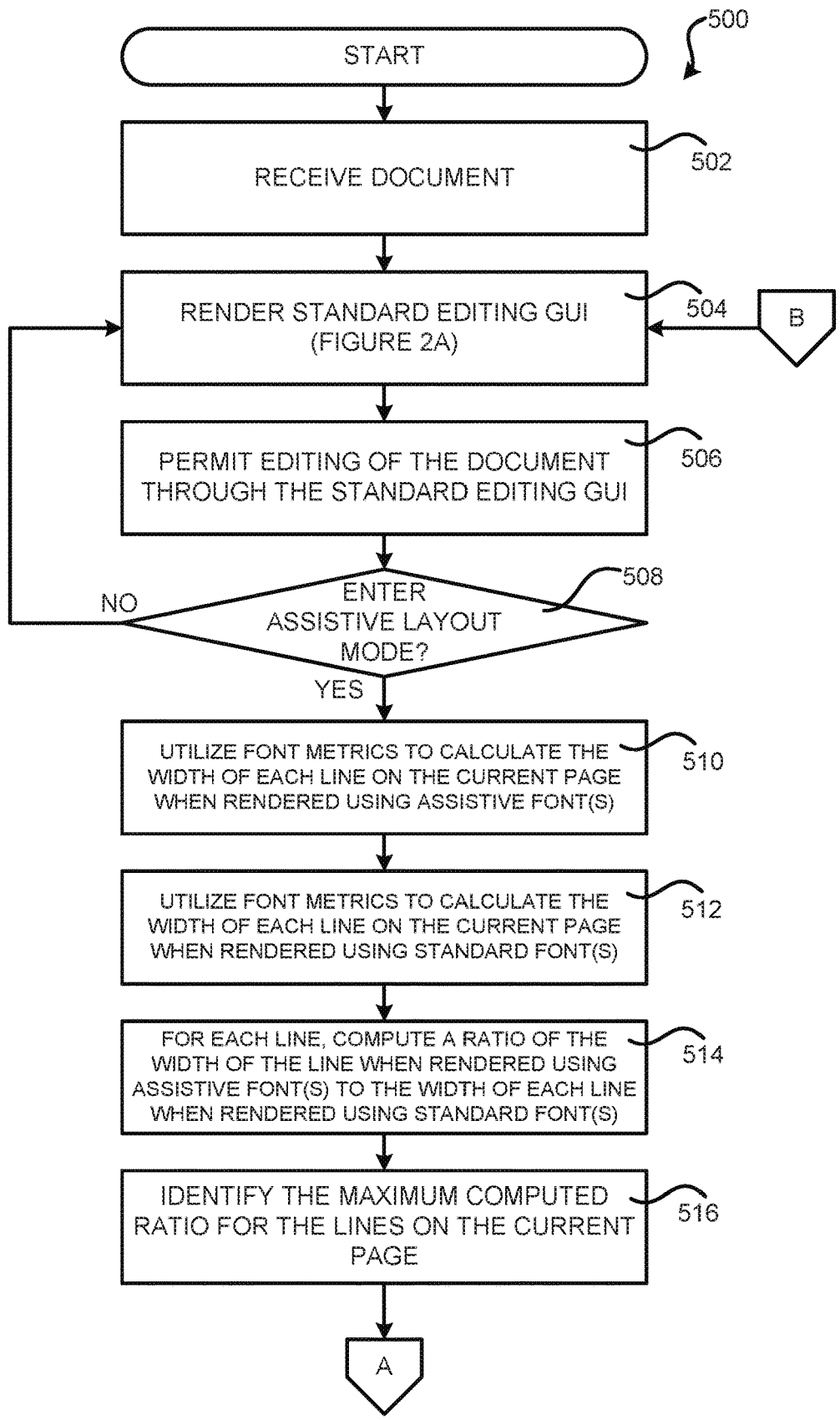
FIGS. 5A and 5B are flow diagrams showing a routine that illustrates aspects of the operation of the assistive document editing GUI shown in FIG. 3, according to various configurations disclosed herein.
Figure 5B:
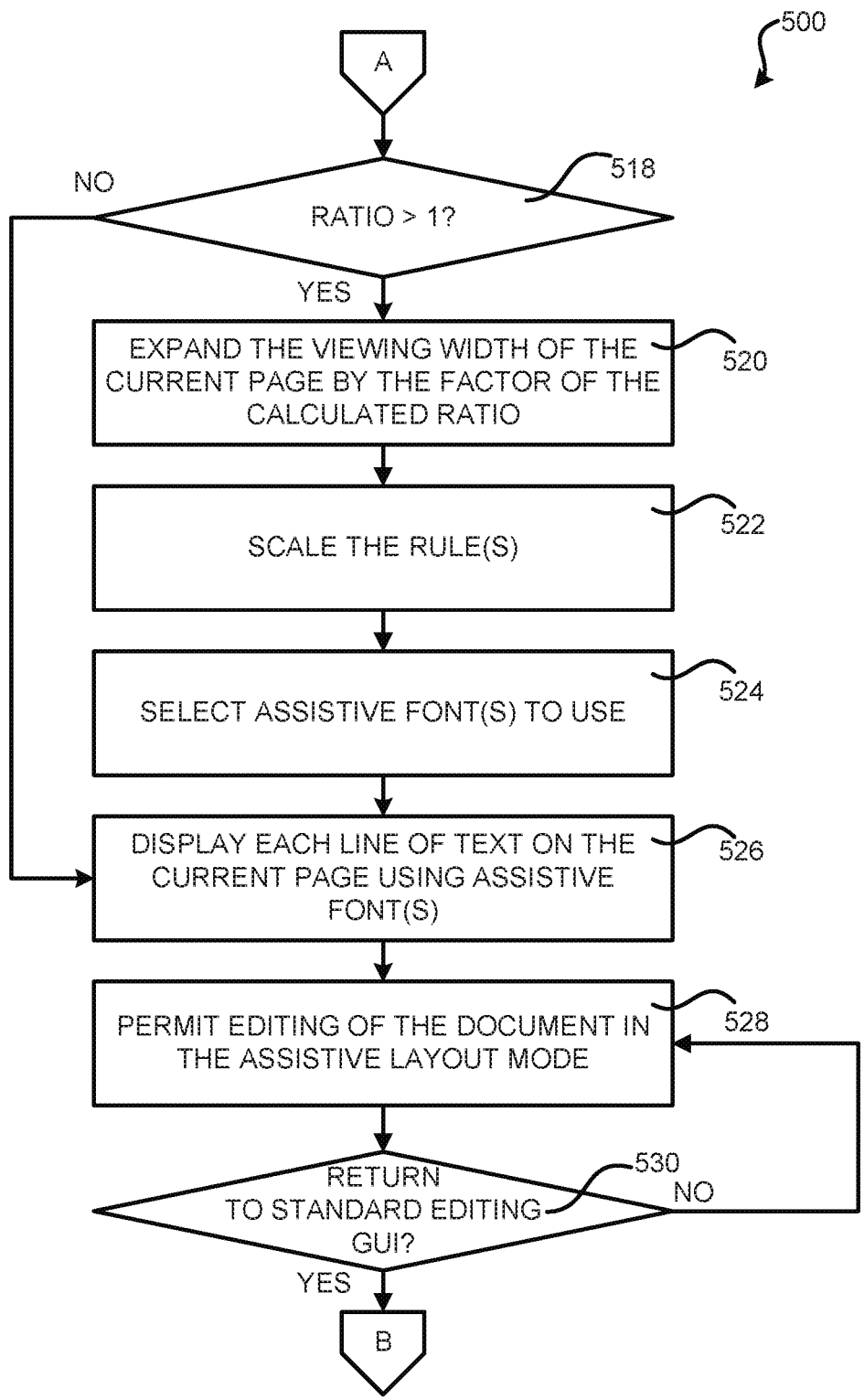

FIGS. 5A and 5B are flow diagrams showing a routine 500 that illustrates aspects of the operation of the assistive document editing GUI 106 shown in FIG. 3 and described above, according to various configurations disclosed herein. It should be appreciated that the logical operations described herein with regard to FIGS. 5A and 5B and the other FIGS. can be implemented (1) as a sequence of computer implemented acts or program modules running on a computing system and/or (2) as interconnected machine logic circuits or circuit modules within the computing system.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 500 begins at operation 502, where the computing device 102 receives a document 112. As discussed above, the document 112 can be obtained from the document server 108 or another location. The document 112 can also be created directly on the computing device 102. From operation 502, the routine 500 proceeds to operation 504.

At operation 504, the application 104 renders the document 112 in the standard document editing GUI 120. As discussed above, the standard document editing GUI 120 provides conventional functionality for creating and editing documents. From operation 504, the routine 500 proceeds to operation 506, where the application 104 permits editing of the document 112 in the standard document editing GUI 120. The routine 500 then proceeds from operation 506 to operation 508.

At operation 508, the application 104 determines whether a request has been received to enter the assistive document editing GUI 106. For instance, a user might utilize the GUI controls described above with regard to FIG. 3 to make such a request. If a request has not been received to enter the assistive document editing GUI 106, the routine 500 proceeds back to operation 504, where editing can continue in the standard document editing GUI 120. If, however, a request is received to edit the document in the assistive document editing GUI 106, the routine 500 proceeds from operation 508 to operation 510.

At operation 510, the application 104 computes the width of each line 218 on the current page of the document 112 when rendered using the assistive fonts 114. The routine 500 then proceeds to operation 512, where the application 104 computes the width of the lines 218 on the current page of the document 112 when rendered in the standard document editing GUI 120 using the standard fonts 116. Font metrics associated with the assistive fonts 114 and the standard fonts 116 can be utilized to calculate the width of the lines 218 when displayed utilizing the respective fonts 114 or 116. Additionally, if a line 218 utilizes multiple fonts or font sizes, the line can be broken into segments according to the fonts and/or font sizes. The width of each line segment can then be determined, and the sum of the widths of the segments will be used as the width of the entire line.

From operation 512, the routine 500 proceeds to operation 514, where the application 104 computes a ratio for each line 218 between the length of the line when displayed in the standard document editing GUI 120 and the length of the line when displayed in the assistive document editing GUI 106 using an assistive font 114. The routine 500 then proceeds from operation 514 to operation 516.

At operation 516, the application 104 identifies the maximum ratio computed at operation 514 for the lines 218. The routine 500 then proceeds to operation 518, where the application 104 determines whether the largest identified ratio is greater than one. If the ratio is not greater than one, the routine 500 proceeds from operation 518 to operation 526, where the lines 218 of text on the current page of the document 112 are displayed using assistive fonts 114. When the ratio is less than one, the page width is not modified in order to keep the page width from shrinking as a result of entering the assistive document editing GUI 106. This process might not be performed in other configurations.

If, at operation 518, the application 104 determines that the largest computed ratio is greater than one, the routine 500 proceeds from operation 518 to operation 520. At operation 520, the application 104 expands the width of the current page by the factor of the largest calculated ratio. In this manner, the on-screen width of the current page in the document 112 can be increased to account for the greater width of the lines 218 of text when displayed using the assistive fonts 114. The routine 500 then proceeds from operation 520 to operation 522.

At operation 522, the application 104 can scale the on-screen rulers 214A and 214B in the manner described above using the largest calculated ratio. In this way, the on-screen rulers 214A and 214B will also be scaled to match the change in the page size performed at operation 520. From operation 522, the routine 500 proceeds to operation 524, where the assistive font 114, or fonts 114, to use are selected. If the standard font 116, or fonts, used in the document 112 have corresponding assistive fonts 114, the corresponding assistive font 114 will be selected. If no corresponding assistive font 114 is present, a default assistive font 114 can be used instead. In this case, the font presented in the assistive document editing GUI 106 might not look the same as when presented in the standard document editing GUI 120. However, the line endings, paragraph endings, and page endings will still be preserved.

From operation 524, the routine 500 proceeds to operation 526, where the application displays each line 218 of text on the current page of the document 112 using the assistive font 114, or fonts 114, identified at operation 524. The routine 500 then proceeds from operation 526 to operation 528.

At operation 528, the application 104 permits editing of the document 112 in the assistive document editing GUI 106. As discussed above, a user can perform conventional document creation and editing functions while in the assistive document editing GUI 106. As the user types into the document 112, the application 104 can calculate when a line 218 would wrap to the next line in the standard document editing GUI 120 and cause the line to wrap to the next line in the assistive document editing GUI 106. In this manner, line ends will be the same in both editing modes.

When the document 112 is saved, the assistive fonts 114 utilized to display the document 112 in the assistive document editing GUI 106 will not be saved with the document. In this manner, the document 112 is not modified to reference or include the assistive fonts 114 as a result of the editing of the document 112 in the assistive document editing GUI 106. From operation 528, the routine 500 proceeds to operation 530.

At operation 530, the application 104 determines whether a request has been made to return to the standard document editing GUI 120. For example, such a request might be made utilizing the GUI controls shown in FIG. 3. If such a request has not been received, the routine 500 proceeds back to operation 528, where document editing in the assistive document editing GUI 106 can continue. If, however, such a request has been received, the routine 500 proceeds from operation 530 back to operation 504, where the standard document editing GUI 120 is again presented. For example, the on-screen rulers 214A and 214B can be returned to their original size and the lines 216 of text on the current page of the document 112 can be displayed using the standard fonts 116.

It should be appreciated that although the mechanism described above is primarily presented in the context of modifying page width as a result of the increase in width of an assistive font, the same process can also be utilized to adjust page height as a result of an increase in the height of an assistive font. In this scenario, the on-screen ruler 214B might also be scaled based upon the increase in the page height. Moreover, it should be further appreciated that although the mechanism described above is primarily described as being executed on a computing device 102 that executes an application 104, this mechanism might be provided by other types of computing devices in other configurations. For example, and without limitation, the functionality disclosed herein can be implemented in conjunction with the provision of a network-based browser-accessible document creation and/or editing application. The technologies disclosed herein can also be utilized with other types of computing systems in other configurations.

It should also be appreciated that the application 104 and the other software components descried above can be implemented using or in conjunction with binary executable files, dynamically linked libraries ("DLLs"), APIs, network services, script files, interpreted program code, software containers, object files, bytecode suitable for just-in-time compilation, and/or other types of program code that can be executed by a processor to perform the operations described herein with regard to FIGS. 5A-5B. Other types of software components not specifically mentioned herein can also be utilized.

Figure 6:
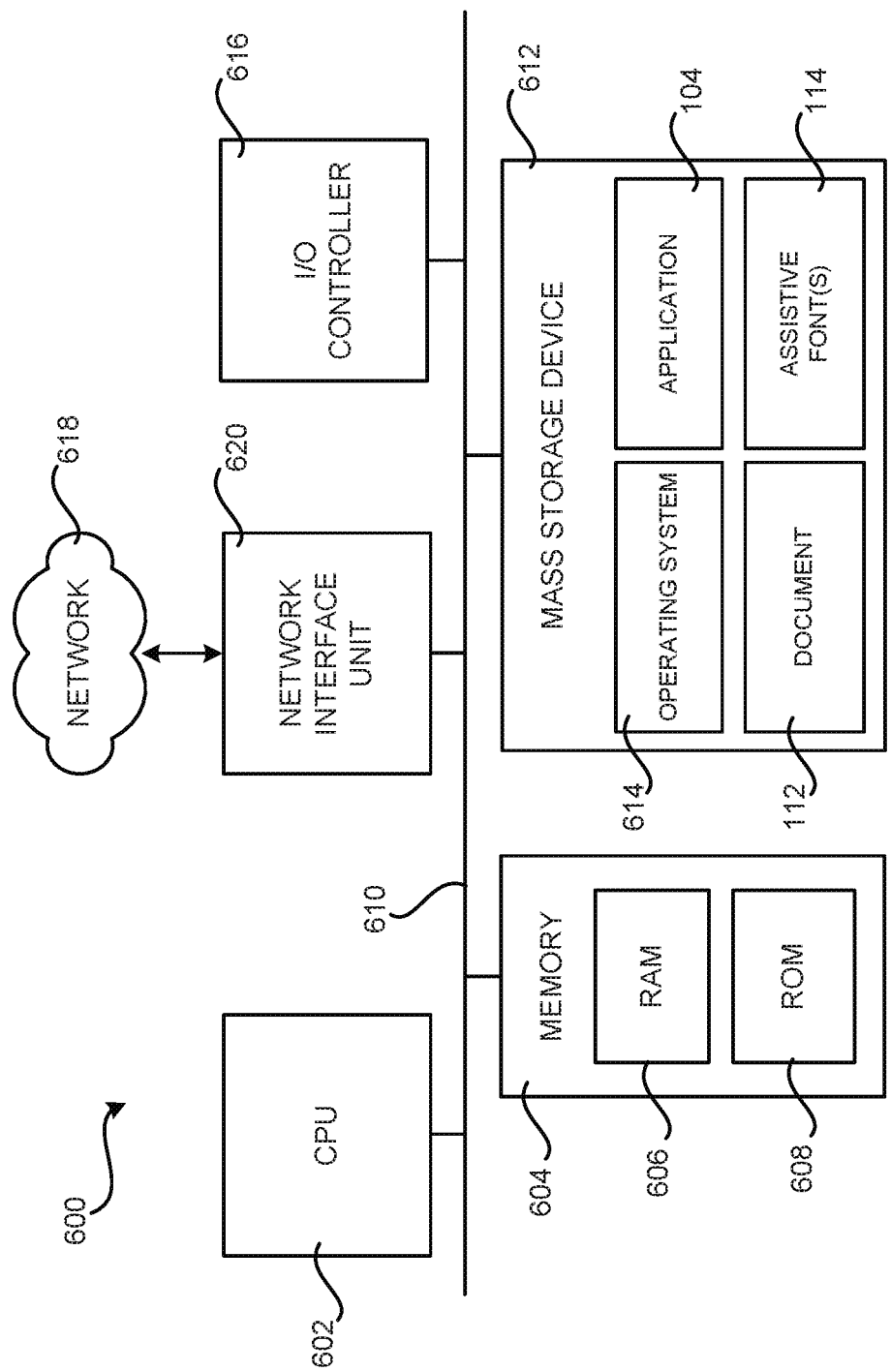
FIG. 6 is a computer architecture diagram showing an illustrative computer hardware and software architecture for a computing system that is capable of implementing aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, e-reader, smart phone, desktop computer, netbook computer, tablet computer, laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to the computer 600 can be utilized to implement the computing device 102 shown in FIG. 1 as executing the application 104 and/or to implement other types of computing systems for executing any of the other software components described above.

The computer 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer 600, such as during startup, is stored in the ROM 608. The computer 600 further includes a mass storage device 612 for storing an operating system 614 and one or more programs including, but not limited to the application 104, and data such as the document 112 and the assistive fonts 114. The mass storage device 612 can also be configured to store other types of programs and data not specifically shown in FIG. 6.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM. EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen, a printer, or other type of output device (also not shown in FIG. 6).

It should be appreciated that the software components described herein, such as the application 104 can, when loaded into the CPU 602 and executed, transform the CPU 602 and the overall computer 600 from a general-purpose computing system into a special-purpose computing system customized to provide the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein, such as the application 104. These computer-executable instructions can transform the CPU 602 by specifying how the CPU 602 transitions between states, thereby transforming the transistors or other discrete hardware elements constituting the CPU 602.

Encoding the software modules presented herein, such as the application 304, can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software components presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It should also be appreciated that the architecture shown in FIG. 6 for the computer 600, or a similar architecture, can be utilized to implement other types of computing devices, including hand-held computers, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
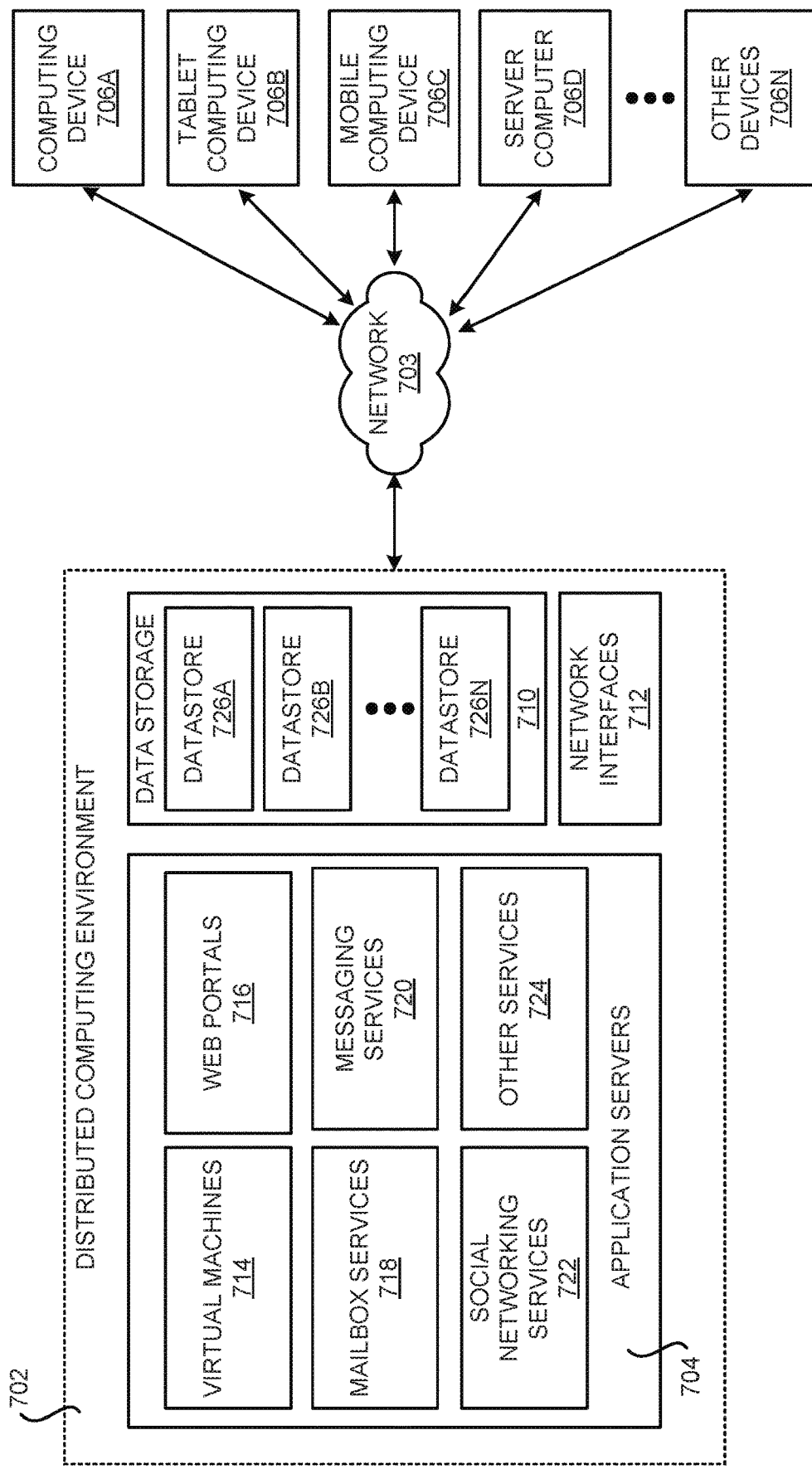
FIG. 7 is a computer system architecture and network diagram illustrating a distributed computing environment capable of implementing aspects of the technologies presented herein.

FIG. 7 shows aspects of an illustrative distributed computing environment 702 in which the software components described herein can be executed. Thus, the distributed computing environment 702 illustrated in FIG. 7 can be used to execute program code, such as the application 104, capable of providing the functionality described herein with respect to FIGS. 1-5B, and/or any of the other software components described herein. For example, and without limitation, the distributed computing environment 702 can be utilized to implement the functionality provided by the document server 108 or a network accessible program or service that provides the functionality disclosed herein, such as a Web-based document editing program.

According to various implementations, the distributed computing environment 702 operates on, in communication with, or as part of a network 703. One or more client devices 706A-706N (hereinafter referred to collectively and/or generically as "clients 706") can communicate with the distributed computing environment 702 via the network 703 and/or other connections (not illustrated in FIG. 7).

In the illustrated configuration, the clients 706 include: a computing device 706A such as a laptop computer, a desktop computer, or other computing device; a "slate" or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the distributed computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 703. The application servers 704 can host various services, virtual machines, portals, and/or other resources. In the illustrated configuration, the application servers 704 host one or more virtual machines 714 for hosting applications or network services, such as the application 104 or other types of applications and/or services. According to various implementations, the virtual machines 714 host one or more applications and/or software modules, such as the application 104. It should be understood that this configuration is illustrative, and should not be construed as being limiting in any way. The application servers 704 might also host or provide access to one or more Web portals, link pages, Web sites, and/or other information ("Web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that might be referred to as "social networking providers." For example, some Web sites allow users to interact with one another via email, chat services, and/or other means during various activities and/or contexts such as reading published articles, commenting on goods or services, publishing, collaboration, gaming, and the like. Other services are possible and are contemplated.

The social networking services 722 can also include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. It can therefore be appreciated that the distributed computing environment 702 can provide integration of the technologies disclosed herein with various mailbox, messaging, social networking, productivity, conversion, and/or other types of services or resources.

As mentioned above, the distributed computing environment 702 can include data storage 710. According to various implementations, the functionality of the data storage 710 is provided by one or more databases operating on, or in communication with, the network 703. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the clients 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. According to various implementations of the technologies disclosed herein, the distributed computing environment 702 provides some or all of the software functionality described herein as a service to the clients 706. It should be understood that the clients 706 can also include real or virtual machines including, but not limited to, server computers, Web servers, personal computers, mobile computing devices, smart phones, and/or other devices. As such, various implementations of the technologies disclosed herein enable any device configured to access the distributed computing environment 702 to utilize the functionality described herein.

Turning now to FIG. 8, an illustrative computing device architecture 800 will be described for a computing device that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the clients 706 shown in FIG. 7. Furthermore, aspects of the computing device architecture 800 are applicable to traditional desktop computers, portable computers (e.g., laptops, notebooks, ultra-portables, and netbooks), server computers, and other computer systems, such as those described herein with reference to FIG. 8. For example, the single touch and multi-touch aspects disclosed herein below can be applied to desktop computers that utilize a touchscreen or some other touch-enabled device, such as a touch-enabled track pad or touch-enabled mouse. The computing device architecture 800 can also be utilized to implement the computing device 102 for executing the application 104, and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more central processing unit ("CPU") cores configured to process data, execute computer-executable instructions of one or more application programs, such as the application 304, and to communicate with other components of the computing device architecture 800 in order to perform aspects of the functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P. 1080P. 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated into the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS MOBILE OS, the WINDOWS PHONE OS, or the WINDOWS OS from MICROSOFT CORPORATION, BLACKBERRY OS from RESEARCH IN MOTION, LTD. of Waterloo, Ontario, Canada, IOS from APPLE INC. of Cupertino, Calif., and ANDROID OS from GOOGLE, INC. of Mountain View, Calif. Other operating systems can also be utilized in other configurations.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited to, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"). Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program, such as the application 304, stored within one of the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance control of some functionality of the application 304. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below, or might include processing functionality built-in to the processor 802.

The display 842 is an output device configured to present information in a visual form. In particular, the display 842 can present GUI elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology, if used. In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon representing the application 304. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C. or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 846 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component. Other configurations can also be utilized.

The disclosure presented herein also encompasses the subject matter set forth in the following clauses:

Based on the foregoing, it should be appreciated that various technologies for providing an assistive GUI capable of preserving the layout of a document while at the same time improving the readability of the document have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, the method comprising:
   enabling editing of a document in a first editing mode using a first font and a second editing mode using a second font, the document comprising a page having a plurality of lines of text;
   calculating a width of each of the plurality of lines of text when rendered using the first font;
   calculating a width of each of the plurality of lines of text when rendered using the second font;
   calculating a ratio of the width of each respective line of the plurality of lines of text when rendered using the first font to the width of the respective line when rendered using the second font;
   identifying a line of the plurality of lines of text having a largest calculated ratio of the calculated ratios; and
   displaying the one or more lines of text using the second font on an expanded on-screen width of the page based upon the ratio of the identified line, wherein displaying includes maintaining the formatting of the plurality of lines of text as rendered when using the first font.

2. The computer-implemented method of claim 1, wherein the second font is an assistive font and wherein the first font is a non-assistive font and wherein the second font has increased spacing between words compared to the first font.

3. The computer-implemented method of claim 1, the method further comprising:
   determining that the largest calculated ratio is greater than one before the displaying.

4. The computer-implemented method of claim 1, the method further comprising:
   receiving one or more edits to the document in the second editing mode;
   receiving a request to save the document; and
   responsive to receiving the request to save the document, causing the one or more edits to the document to be saved in the document without saving the second font in the document.

5. The computer-implemented method of claim 1, wherein the document further comprises an image, and wherein the method further comprises:
   displaying the image in the first editing mode; and
   responsive to receiving a request to edit the document in the second editing mode and the image being a vector image, scaling the image based upon the largest calculated ratio and based on the image being a vector image.

6. The computer-implemented method of claim 1, wherein the document further comprises an image, and wherein the method further comprises:
   displaying the image in the first editing mode; and
   responsive to receiving a request to edit the document in the second editing mode and the image being a bitmap image, displaying a border around the image, the border having dimensions computed based upon dimensions of the image and the largest calculated ratio.

7. The computer-implemented method of claim 1 wherein a line of text of the plurality of lines of text ends at a first location when displayed in the first editing mode, and wherein the line of text ends at the first location when scaled to the expanded on-screen width of the page when displayed using the second font in the second editing mode.

8. An apparatus, comprising:
   one or more processors; and
   at least one computer storage medium having computer executable instructions stored thereon which, when executed by the one or more processors, cause the apparatus to:
   enable editing of a document in a first editing mode using a first font and a second editing mode using a second font, the document comprising a page having a plurality of lines of text;
   calculate a width of each of the plurality of lines of text when rendered using the first font;
   calculate a width of each of the plurality of lines of text when rendered using the second font;
   calculate a ratio of the width of each respective line of the plurality of lines of text when rendered using the first font to the width of the respective line when rendered using the second font;
   identify a line of the plurality of lines of text having a largest calculated ratio of the calculated ratios; and
   display the one or more lines of text using the second font on an expanded on-screen width of the page based upon the ratio of the identified line, wherein displaying includes maintaining the formatting of the plurality of lines of text as rendered when using the first font.

9. The apparatus of claim 8,
   wherein the second font is an assistive font and wherein the first font is a non-assistive font and wherein the second font has increased spacing between words compared to the first font.

10. The apparatus of claim 8, wherein the at least one computer storage medium has further computer executable instructions stored thereon to:
    determine that the largest calculated ratio is greater than one before the displaying.

11. The apparatus of claim 8, wherein the at least one computer storage medium has further computer executable instructions stored thereon to:
- receive one or more edits to the document in the second editing mode;
- receive a request to save the document; and
- responsive to the request to save the document, cause the one or more edits to the document to be saved in the document without saving the second font in the document.

12. The apparatus of claim 8, wherein the document further comprises an image, and wherein the at least one computer storage medium has further computer executable instructions stored thereon to:
- display the image in the first editing mode; and
- responsive to a request to edit the document in the second editing mode and the image being a vector image, scale the image based upon the largest calculated ratio.

13. The apparatus of claim 8, wherein the document further comprises an image, and wherein the at least one computer storage medium has further computer executable instructions stored thereon to:
- display the image in the first editing mode; and
- responsive to a request to edit the document in the second editing mode and the image being a bitmap image, display a border around the image, the border having dimensions computed based upon dimensions of the image and the largest calculated ratio.

14. The apparatus of claim 8, wherein a line of text of the plurality of lines of text ends at a first location when displayed in the first editing mode, and wherein the line of text ends at the first location when scaled to the expanded on-screen width of the page when displayed using the second font in the second editing mode.

15. A computer-storage medium having computer executable instructions stored thereon which, when executed by one or more processors, cause the one of more processors to:
- enable editing of a document in a first editing mode using a first font and a second editing mode using a second font, the document comprising a page having a plurality of lines of text;
- calculate a width of each of the plurality of lines of text when rendered using the first font;
- calculate a width of each of the plurality of lines of text when rendered using the second font;
- calculate a ratio of the width of each respective line of the plurality of lines of text when rendered using the first font to the width of the respective line when rendered using the second font;
- identify a line of the plurality of lines of text having a largest calculated ratio of the calculated ratios; and
- display the one or more lines of text using the second font on an expanded on-screen width of the page based upon the ratio of the identified line, wherein displaying includes maintaining the formatting of the plurality of lines of text as rendered when using the first font.

16. The computer-storage medium of claim 15, wherein the second font is an assistive font and wherein the first font is a non-assistive font and wherein the second font has increased spacing between words compared to the first font.

17. The computer-storage medium of claim 15, having further computer executable instructions stored thereon to:
- determine that the largest calculated ratio is greater than one before the displaying.

18. The computer-storage medium of claim 15, having further computer executable instructions stored thereon to:
- receive one or more edits to the document in the second editing mode;
- receive a request to save the document; and
- responsive to the request to save the document, cause the one or more edits to the document to be saved in the document without saving the second font in the document.

19. The computer-storage medium of claim 15, wherein the document further comprises an image, and having further computer executable instructions stored thereon to:
- display the image in the first editing mode; and
- responsive to a request to edit the document in the second editing mode and the image being a vector image, scale the image based upon the largest calculated ratio.

20. The computer-storage medium of claim 15, wherein a line of text of the plurality of lines of text ends at a first location when displayed in the first editing mode, and wherein the line of text ends at the first location when scaled to the expanded on-screen width of the page when displayed using the second font in the second editing mode.

* * * * *